J. & E. PANTON.
Improvement in Harvesters.
No. 132,408.  Patented Oct. 22, 1872.
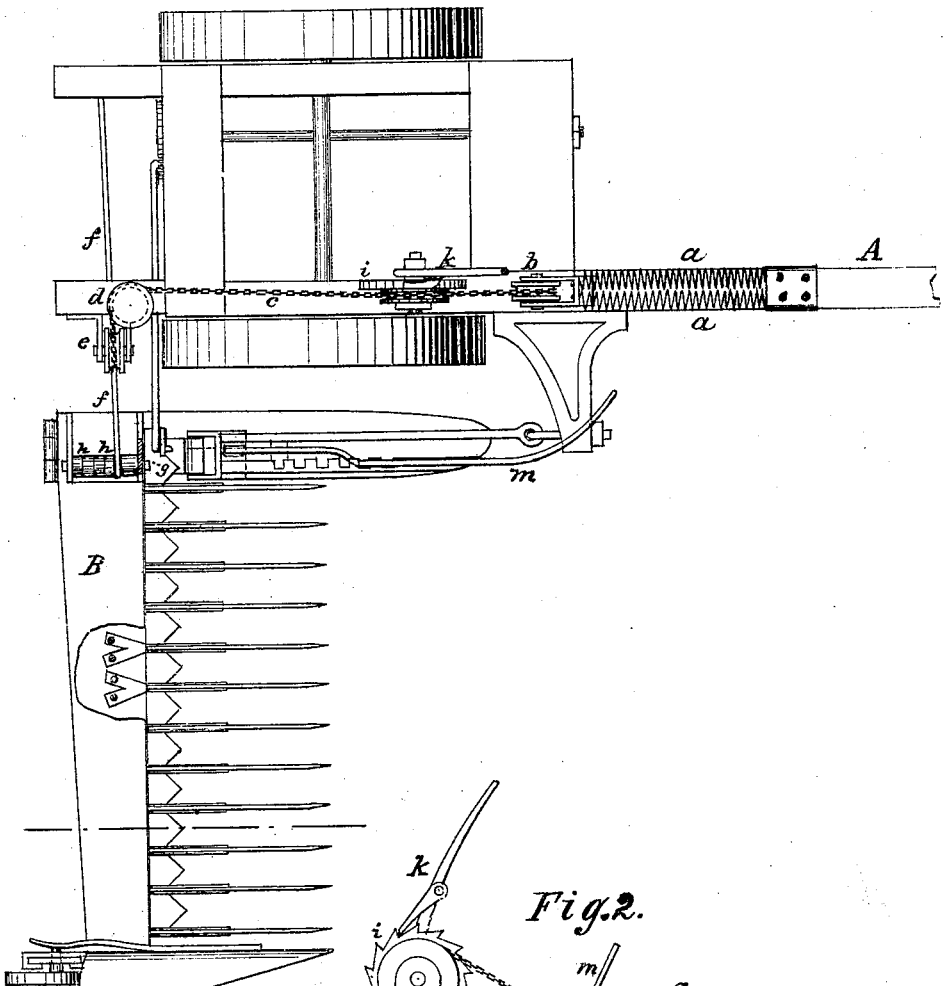
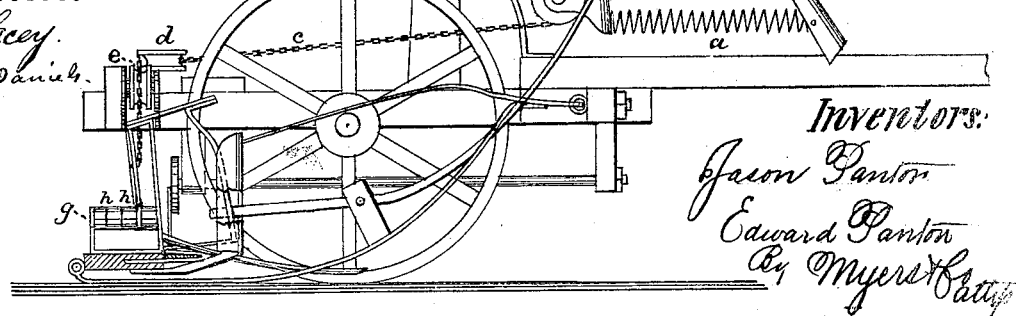

UNITED STATES PATENT OFFICE.

JASON PANTON AND EDWIN PANTON, OF LONDON, CANADA.

IMPROVEMENT IN HARVESTERS.

Specification forming part of Letters Patent No. 132,408, dated October 22, 1872.

*To all whom it may concern:*

Be it known that we, JASON PANTON and EDWIN PANTON, of the city of London, county of Middlesex and Province of Ontario, in the Dominion of Canada, have invented certain Improvements in Harvesters, of which the following is a specification:

Our invention relates to machines for harvesting lodged grain and peas; and consists in certain improvements upon harvesting and reaping machines, adapting them to such purposes, as hereinafter described and shown.

In the accompanying plate of drawing, which illustrates our invention and forms a part of the specification thereof, Figure 1 is a plan view of our improved harvester. Fig. 2 is a side elevation of same.

In the said drawing, letter A designates the pole or tongue, to which are attached the coiled springs $a$, which are connected, by the chain $c$ passing over the pulleys $b$ $d$ $e$, to the lifting-bar $f$. The said lifting-bar is connected with the finger-bar or table B, containing the cutting apparatus, &c., by the long bolt $g$ having the washers $h$. The inclination of the cutters may be changed as desired by means of lever $m$. The other parts of the machine are of the forms shown in the drawing. The coiled springs $a$ are deemed by the inventors as best adapted to the machine, though other styles may be used for a like purpose. They may be increased or diminished in number, according to the weight of the table, the object being to allow the table to run close and regulate its course with the surface of the ground without pressing heavily upon it. The chain $c$ is contracted or lengthened by means of the ratchet-wheel $i$ and lever and pawl $k$. The pulleys $d$ and $e$, over which the said chain passes to the lifting-bar $f$, being placed between the springs and weight, serve to greatly increase the elasticity of the springs and reduce by one-half the power required to raise the table. The chain $c$, being attached to the lifting-arm at a point very near the heaviest part of the table, causes nearly the whole weight of the table to come upon the main carriage or wheels of the machine, so that the small wheel at the outer extremity supports but little weight and readily passes over obstructions. The bolt $g$, connecting the lifting-arm and table, is made long so as to allow the lifting-arm to be moved forward or backward, at pleasure, in order to secure a balancing of the finger-bar or table B. The said bolt is provided with the washers $h$ so as to retain the lifting-arm in position at the desired point. The pulleys $d$ and $e$ are also allowed a lateral motion to adapt them to the sliding motion of the lifting-arm.

We claim—

The combination of the springs $a$, chain $c$ operated by wheel $i$ and lever $k$, lifting-arm $f$, pulleys $d$ and $e$, bolt $g$ with washers $h$, and finger-bar or table B, all being constructed and operating as described.

In testimony of this our application for Letters Patent for an improvement in harvesters we have hereunto subscribed our names.

JASON PANTON.
EDWIN PANTON.

Witnesses:
JOHN LOWRIE,
SAML. McBRIDE.